United States Patent [19]

Ford

[11] Patent Number: 4,676,041
[45] Date of Patent: Jun. 30, 1987

[54] CORROSION-RESISTANT DOOR AND ITS METHOD OF MANUFACTURE

[75] Inventor: Glenn A. Ford, Warminster, Pa.

[73] Assignee: Warminster Fiberglass Co., Southampton, Pa.

[21] Appl. No.: 799,599

[22] Filed: Nov. 19, 1985

[51] Int. Cl.[4] .......................... B32B 5/16; B29C 17/08
[52] U.S. Cl. ................................. 52/309.11; 264/257; 264/273; 264/279.1; 428/317.7
[58] Field of Search .............. 264/DIG. 6, 273, 279.1, 264/101, 102, 257; 428/317.7; 52/309.11

[56] References Cited

U.S. PATENT DOCUMENTS

| | | | |
|---|---|---|---|
| 3,328,500 | 6/1967 | Barnette | 264/108 |
| 3,832,264 | 8/1974 | Barnette | 264/273 X |
| 4,374,693 | 2/1983 | Pitt | 428/309.9 X |
| 4,560,523 | 12/1985 | Plumley et al. | 264/257 X |

Primary Examiner—Philip Anderson
Attorney, Agent, or Firm—Michael Ebert

[57] ABSTRACT

A corrosion-resistant door constituted by a one-piece integrated structure of high strength, free of assembly joints and seams. The door includes a rectangular core formed by a slab of rigid closed-cell foam plastic or other material having an array of holes therein extending between the opposing faces of the slab. The core is encapsulated within a rigid plastic shell formed by resin-impregnated fiberglass having a smooth, non-porous resin outer skin. The structure is reinforced by resin dowels which extend through the holes in the core to bridge the opposing faces of the shell. The door is fabricated by a resin transfer molding technique in which a core wrapped in dry fiberglass or other reinforcing material is placed in the mold and a liquid catalyzed resin is injected therein, which then cures to define the shell.

11 Claims, 5 Drawing Figures

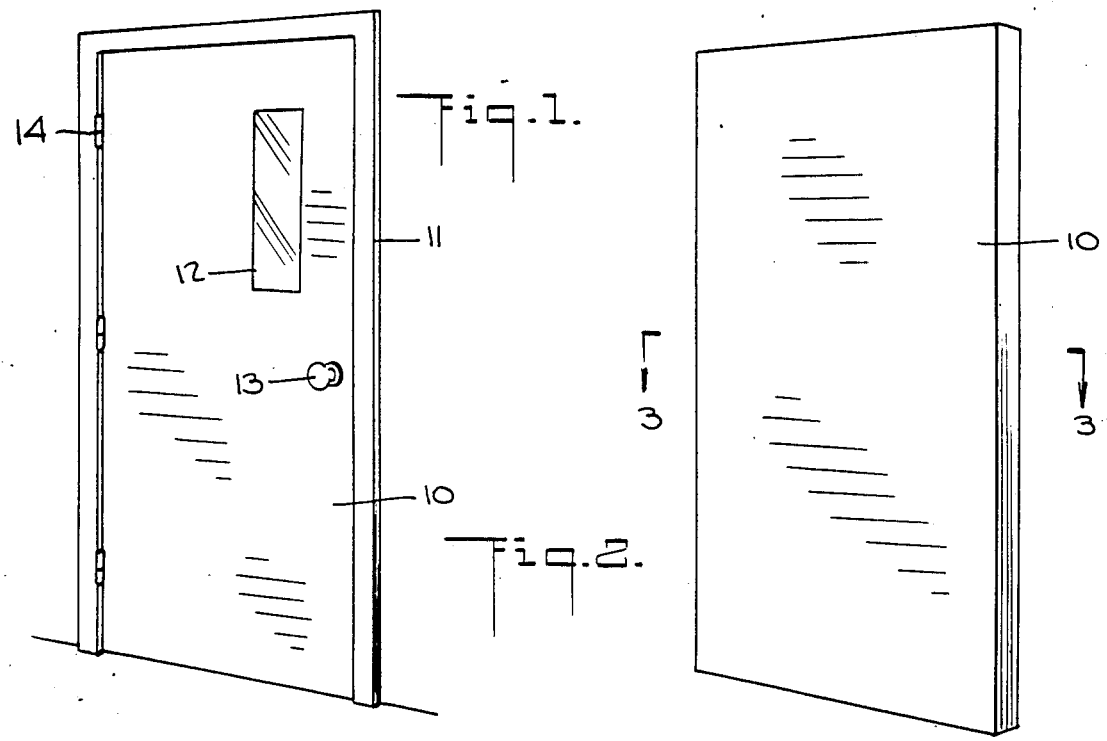
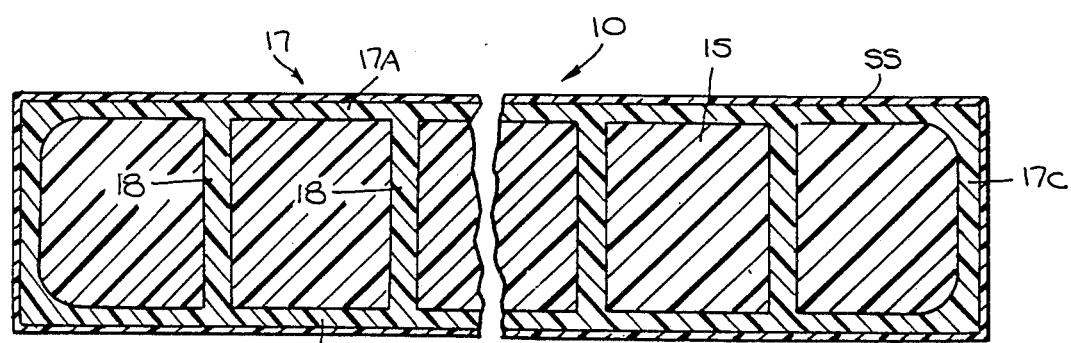
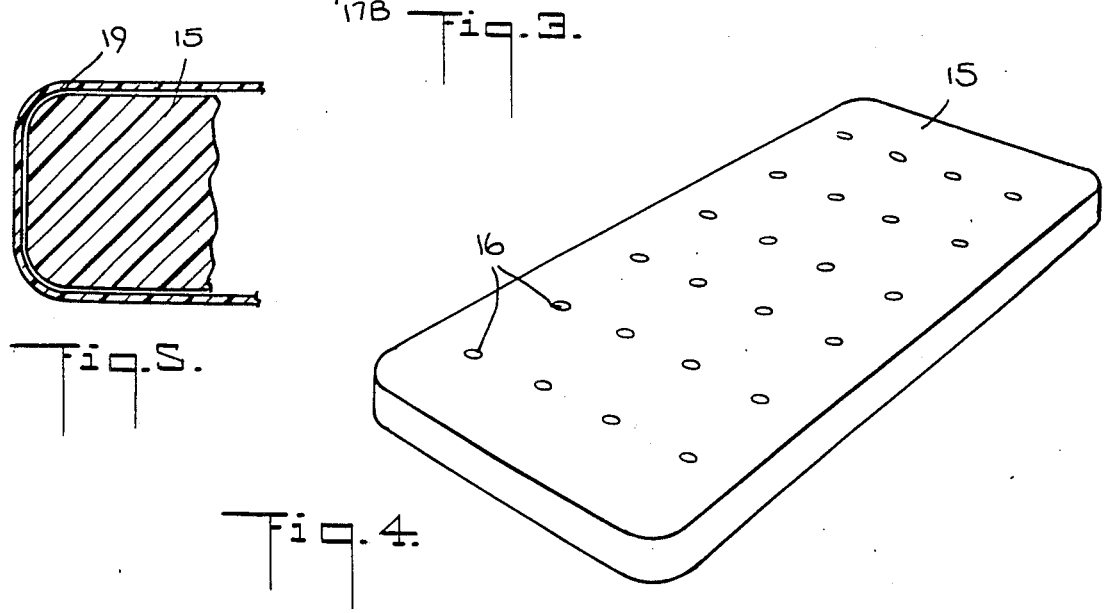

CORROSION-RESISTANT DOOR AND ITS METHOD OF MANUFACTURE

BACKGROUND OF INVENTION

1. Field of Invention:

This invention relates generally to corrosion-resistant doors, and more particularly to an integrated one-piece fiberglass-reinforced molded plastic door, and to a method of fabricating a door of this type.

Conventional doors, whether made of wood, metal, synthetic plastic, or combinations of these materials, function effectively under normal environmental conditions. However, such doors are usually incapable of withstanding the difficult atmospheric conditions which prevail in pulp and paper mills, municipal and industrial water and sewage treatment plants, petro-chemical refineries, food and drug processing plants and in other installations in which doors are subjected to abnormal environmental conditions. Under such conditions, the atmosphere may be highly corrosive or exceptionally humid, or in other respects possess deleterious properties.

Thus, in many food processing plants the atmosphere in some areas may be subject to high concentration of moisture. With a typical jointed door, this atmosphere may result in delamination, cracking and in other defects. In a chemical processing plant, the atmosphere may contain hydrochloric acid and other corrosive vapors to which the conventional door is not resistant. In medical and drug laboratories, it is essential that the doors be non-porous and without crevices or cracks that may collect microbes. Conventional doors do not satisfy this requirement.

In order to provide an atmospheric-resistant door capable of withstanding abnormal conditions, the Pitt U.S. Pat. No. 4,374,693 discloses a door structure which includes a rectangular frame to which fiberglass reinforced face plates are attached, sounddampening material being sandwiched between these plates.

A door structure of the Pitt type is superior to a conventional door in a corrosive or humid environment, but it is relatively difficult and costly to manufacture, for the components have to be assembled and joined together. Also of prior art interest are the Burnett U.S. Pat. Nos. 3,328,500 and 3,832,264, and the Prosinski U.S. Pat. No. 3,232,017.

SUMMARY OF INVENTION

In view of the foregoing, the main object of this invention is to provide a door of high strength which is molded in one piece, entirely without joints, secondary bonding or welding.

A significant feature of a door in accordance with the invention is that it possesses exceptional resistance to corrosion, sunlight and other atmospheric conditions which degrade conventional doors.

More particularly, an object of this invention is to provide a corrosion-resistant door and a method of fabricating same, whereby the door may be mass-produced at relatively low cost, the door being usable under environmentally difficult conditions such as are encountered in chemical processing plants.

Briefly stated, these objects are accomplished in a corrosion-resistant door constituted by a one-piece integrated structure of high strength, free of assembly joints and seams. The door includes a rectangular core formed by a slab of rigid closed-cell foam plastic or other material, such as blown glass or a ceramic body, having an array of holes therein extending between the opposing faces of the slab. The core is encapsulated within a rigid plastic shell formed by resin-impregnated fiberglass having a smooth, non-porous resin outer skin. The structure is reinforced by resin dowels which extend through the holes in the core to bridge the opposing faces of the shell.

The door is fabricated by a resin transfer molding technique in which a core wrapped in dry fiberglass or other reinforcing material is placed in the mold and a liquid catalyzed resin is injected therein which then cures to define said shell.

OUTLINE OF DRAWINGS

For a better understanding of the invention as well as other objects and further features thereof, reference is made to the following detailed description to be read in conjunction with the accompanying drawings, wherein:

FIG. 1 illustrates a door in accordance with the invention in its closed state within a frame, the door having a window, a door knob and hinges;

FIG. 2 is a perspective view of the door with the window, the door knob and the hinges omitted;

FIG. 3 is a transverse section taken through the door in the plane indicated by line 3—3 in FIG. 2;

FIG. 4 is a separate perspective view of the core; and

FIG. 5 is a longitudinal section taken through one end of the core and of the dry fiberglass which is wrapped about the core before resin impregnation in a mold.

DESCRIPTION OF INVENTION

The Door Structure

Referring now to FIG. 1, there is shown a door 10 in accordance with the invention which is fitted within a rectangular frame 11 in a wall. The door is provided with a narrow window 12, a door knob 13 and hinges 14 which couple the door to the frame.

Door 10 is molded, in a manner to be later explained, in one piece without any secondary bonding or welding, there being no joints at all. Frame 11 may be molded of fiberglass reinforced polyester resin in the required size. In practice, the door and its frame are resin transfer molded in matched metal molds in one piece with all edges and surfaces molded in. There are no secondary assembly operations, no joints to crack, and the door is not in any way subject to delamination.

The door includes a core 15 in the form of a generally rectangular slab preferably of rigid closed-cell foam plastic material of polyurethane or other foam plastic material affording both thermal insulation and soundproofing properties. Alternatively, the slab may be formed of blown glass foam or a ceramic material, such as sintered alumina. The corners of the slab are rounded. Bored into slab 15 is a symmetrical array of holes 16 which extend between the opposite faces of the slab.

Core 15 is encapsulated within a shell 17 formed by resin-impregnated fiberglass to define upper and lower shell faces 17A and 17B and side edges 17C which surround the edges of the core so that the core is completely enveloped and bonded to the shell. The resin used for this purpose is preferably a polyester resin which is self-extinguishing and compatible with fiberglass.

The outer skin SS of the shell is smooth and non-porous and is formed by a polyester resin which may be pigmented to impart a desired color to the door. The outer skin has no fiberglass therein and is integral with the resin in the resin-impregnated fiberglass.

Because the corners of the core 15 are rounded, there is more resin at these corners in the region between the core and the shell, this serving to beef up the structure in the corner regions. The holes 16 in the core are filled with polyester resin to form rigid dowels 18 that bridge the parallel faces 17A and 17B of the shell and act to reinforce the door structure.

Fabrication

The door is fabricated using a resin-transfer molding technique. Resin transfer molding is a two-step injection molding process in which the raw material, in this case, liquid catalyzed polyester resin, is pumped from a separate transfer chamber into a closed mold whose cavity, in this case, has the shape of the door.

In making the door, slab 15 is first wrapped in dry fiberglass 19 and then placed in the mold. This fiberglass may consist of a surfacing mat followed by a continuous strand mat or other reinforcement wrapped about the core. In practice, graphite fibers or other known forms of woven or non-woven reinforcing fibers may be used for the wrapping.

The internal walls of the mold are first coated with the liquid catalyzed resin material which in the door forms the outer skin SS of the shell, after which the fiberglass-wrapped core is placed in the mold which is then closed and tightly clamped together. The liquid catalyzed polyester from the transfer chamber is then injected into the closed mold to impregnate the fiberglass to form the shell and to flow through the holes in the core to create the reinforcing dowels 18.

The mold is maintained in the closed state until the polyester cures, in the course of which the resin which impregnates the fiberglass fuses with the surface resin forming the smooth outer skin. When, therefore, the curing is complete, the resultant door, which is removed from the mold, requires no further processing or molding.

The window opening, the door hardware openings and flush hinge recesses are molded according to conventional practice. Also molded in are pre-tapped steel or aluminum plates to receive screws for attaching the hardware. The choice of metal used in the hinges and other hardware (stainless steel, bronze or aluminum) will depend on the atmospheric conditions for which the door is designed.

Thus, the resultant door, which is of exceptional strength, is non-porous, seamless and, because of its polyester skin, is non-reactive with moisture or corrosive chemicals. Also, the skin is impervious to sunlight and other forms of radiation.

While there has been shown and described a preferred embodiment of a CORROSION-RESISTANT DOOR, it will be appreciated that many changes and modifications may be made therein without, however, departing from the essential spirit thereof, in accordance with the invention.

I claim:

1. A door constituted by a onepiece integrated structure of high strength free of assembly joints and seams, the door comprising:
    A a rectangular slab-shaped core of rigid foam plastic material having a rectangular array of holes therein which extend between opposing faces of the core and are distributed in the transverse and longitudinal directions;
    B a rectangular plastic shell encapsulating said core and including opposing faces, said shell being formed by polyester resin-impregnated reinforcing fibers; and
    C polyester resin dowels extending through the holes in the core to bridge the opposing faces of the shell to reinforce the structure of the door.

2. A door as set forth in claim 1, wherein said fibers are fiberglass.

3. A door as set forth in claim 1, wherein said shell is provided with an outer skin fused thereto formed of resin to provide the door with a smooth, non-porous finish.

4. A door as set forth in claim 1, wherein said core is formed of closed-cell polyurethane material.

5. A door as set forth in claim 1, wherein said core is formed of foamed glass material.

6. A door as set forth in claim 1, wherein said shell resin is a polyester.

7. A door as set forth in claim 1, wherein said skin resin is a polyester.

8. A door as set forth in claim 1, wherein the corners of the core are rounded to provide enlarged regions between the corners of the core and the corners of the shell which is filled with reinforcing resin.

9. The method of forming a door by a resin transfer molding technique comprising the steps of:
    A wrapping a slab-shaped core of rigid foam plastic material in dry reinforcing fibers, said core having a rectangular array of holes therein which extend between the opposing faces of the core and are distributed in the transverse and longitudinal directions;
    B placing said wrapped core in a mold and closing the mold; and
    C injecting a liquid catalyzed polyester resin into the mold to fill the holes in the core with resin and to impregnate the fibers in the wrapping thereon to create, when the resin is cured, a resin reinforced shell having opposing faces and resin reinforcing dowels extending through the holes to bridge the opposing faces of the shell to create an integrated one-piece structure of high strength.

10. A method as set forth in claim 9, wherein the internal walls of the mold, before the wrapped core is placed therein, is coated with the liquid catalyzed resin which, in the course of curing, fuses with the resin reinforced shell to provide said shell with a smooth outer skin.

11. A method as set forth in claim 9, wherein said fibers are constituted by fiberglass.

* * * * *